United States Patent Office 3,824,292
Patented July 16, 1974

---

3,824,292
BROMINATION PROCESS
John A. Kirby, Indianapolis, Ind., assignor to Eli Lilly and Company, Indianapolis, Ind.
No Drawing. Filed Oct. 16, 1972, Ser. No. 298,054
Int. Cl. C07c 47/14, 47/20
U.S. Cl. 260—602                                     5 Claims

ABSTRACT OF THE DISCLOSURE

A process for brominating a 1,1,3,3-tetraloweralkoxypropane, which process yields a mixed reaction product wherein a 2-bromo-3-loweralkoxyacrolein is the major constituent.

BACKGROUND OF THE INVENTION

1. Field of the Invention

Certain pyrimidinemethanols have been found to be very useful agricultural chemicals. Belgian Pat. 714,003, teaches a series of these pyrimidinemethanols as being useful as plant fungicides. One method taught for the preparation of the compounds involves 5-bromopyrimidine as starting material. The present invention is concerned with the preparation of a starting material useful in the synthesis of 5-bromopyrimidine.

2. Description of the Prior Art

Bredereck et al., Chem. Ber. 95, 803 (1962), teach the preparation of 2-bromo-1,1,3,3-tetraethoxypropane by the reaction of elemental bromine with 1,1,3,3-tetraethoxypropane in carbon tetrachloride as solvent, at about 40° C., under ultraviolet light. The reaction product mixture was worked up by washing with sodium bicarbonate solution, drying over anhydrous sodium sulfate, and distilling at reduced pressure. There was no mention of by-products. In my hands, the basic wash procedure yielded emulsions which were difficult to handle and not amenable to large-scale production. Following the procedure of Bredereck et al., the yield of 2-bromo-1,1,3,3-tetraethoxypropane reported by that author could not be duplicated. Bredereck et al. utilized the 2-bromo-1,1,3,3-tetraethoxypropane which they prepared in the synthesis of 5-bromopyrimidine.

The compound, 2-bromo-3-methoxyacrolein is described in the prior art by Shostakovskii, M. F., Kuznetsov, N. V., Yang Che-Min., Izvest. Akad. Nauk U.S.S.R., Otdel. Khim. Nauk 1961. Pp. 1685–1688. [C.A. 56, 5808c (1962).]

SUMMARY OF THE INVENTION

The present invention relates to a process for the bromination of a 1,1,3,3-tetraloweralkoxypropane to obtain a product comprised predominantly of 2-bromo-3-loweralkoxyacrolein. The process comprises the addition of bromine to a solution of the 1,1,3,3-tetraloweralkoxypropane in a lower alkanol solvent, heating of the reaction product mixture thus produced at atmospheric pressure to remove volatile by-products, followed by heating of the reaction product mixture under vacuum to yield product containing 2-bromo-3-loweralkoxyacrolein as the major constituent.

DESCRIPTION OF THE PREFERRED EMBODIMENT

This invention relates to a process for brominating a 1,1,3,3-tetraloweralkoxypropane of the formula

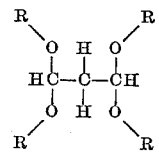

wherein R is $C_1$–$C_3$ alkyl. While the process can be carried out in the absence of a solvent, it is preferable that a lower alkanol be used as solvent.

In the above formula, $C_1$–$C_3$ alkyl is illustratively methyl, ethyl, n-propyl, or isopropyl.

The term lower alkanol as used herein refers to methanol, ethanol, n-propanol or isopropanol.

In general, in carrying out the reaction, the bromine is added to and commingled with the 1,1,3,3-tetraloweralkoxypropane which is being stirred and heated. Equimolar quantities of bromine and substituted propane are preferably utilized, although a slight excess of either reactant is permissible. The bromine is added rapidly to the heated substituted propane.

Although the bromination can be run in the absence of a solvent, it is preferred that a solvent be present. Suitable solvents are the lower alkanols, namely, methanol, ethanol, n-propanol, and isopropanol. It has been found that the presence of a solvent permits better control of the reaction which tends to become exothermic as the bromine is added. The solvent helps to prevent overheating and consequent decomposition of the reactants and promotes a better yield of product. The solvent is suitably present in a ratio of about one to about two moles of solvent per mole of 1,1,3,3-tetraloweralkoxypropane. When the bromination is carried out in the presence of a solvent, the mixture of solvent and substituted propane is heated to its reflux temperature during the addition of the bromine.

When addition of the bromine is complete, the reaction mixture is heated at atmospheric pressure for a time to allow the by-products, bromoloweralkane and lower alkanol, to distill off. In the case where a lower alkanol solvent is used, heating the reaction mixture to boiling serves to promote removal of the aforesaid by-products, as well as excess solvent, all of which are simultaneously distilled off. The heating at atmospheric pressure suitably proceeds for from about ten or about thirty minutes. The by-products, bromoloweralkane and lower alkanol, and excess solvent alkanol can be recovered if desired.

In the final step of the process, the reaction product mixture is heated to a temperature of about 100° C. to about 120° C., and concentrated in vacuo (5–10 mm. Hg) for about one-half to one hour, preferably about three-quarters of an hour.

It has unexpectedly been found that this additional heating under vacuum during the work-up is most beneficial in that it makes it possible to obtain a greater amount of 2-bromo-3-loweralkoxyacrolein as the major constituent of the product of the bromination. The heating at reduced pressure appears to assist in the acid-catalyzed elimination of alkanol and lower alkyl bromide from 2-bromo-1,1,3,3-tetraloweralkoxypropane to give the 2-bromo-3- loweralkoxyacrolein. This product is desired because of its greater reactivity in the condensation step to follow. The substituted acrolein, because of its double bond in conjugation with the carbonyl group, has been found to be more reactive in a condensation reaction than the 2-bromo-1,1,3,3-tetraloweralkoxyropane of Bredereck et al.

For example, when the mixed bromination product obtained by my novel process and containing about 85 percent 2-bromo-3-methoxyacrolein, was condensed with formamide following the Bredereck et al. procedure, 5-bromopyrimidine was obtained in 50 percent yield. In contrast, when the bromination product, 2-bromo-1,1,3,3-tetramethoxypyropane, obtained following the Bredereck et al. procedure, was condensed with formamide, the yield of 5-bromopyrimidine obtained was less than 40 percent.

The crude reaction product mixture containing 2-bromo-3-methoxyacrolein can also be reacted with hydrazine or hydroxylamine to yield 4-bromopyrazole or 4-bromoisoxazole, respectievly.

The novel bromination reaction is illustrated by the following example.

*Example G*

In a three-neck, 500 ml. flask, provided with a Friedrich style reflux condenser, dropping funnel, thermometer and magnetic stirrer, are placed 164 g. (1 mole) of 1,1,3,3-tetramethoxypropane, and 64 g. (2 moles) of methanol. The mixture is stirred at about 50° C., and during a period of about 5-10 minutes, a total of 160 g. (1 mole) of bromine is added through the dropping funnel, the addition tube of which extends below the surface of the refluxing mixture. After the addition of the bromine has been completed, the reflux condenser is removed and the reaction product mixture is held at its boiling point, a temperature of about 75° C., for an additional 10 minutes until most of the volatile by-products, methyl bromide and methanol, have been driven off.

The reaction product mixture is then concentrated under reduced pressure (6 mm. Hg) while being heated to about 120° C. for about 45 minutes. At the end of this, the reaction product mixture is ready for use. It weighs about 180 g. The reaction product mixture was analyzed using vapor phase chromatography and found to be comprised of about 85 weight percent of 2-bromo-3-methoxyacrolein, with the other 15 percent comprised of 2-bromo-3,3-dimethoxypropanal, 2-bromo-1,1,3,3-tetramethoxypropane, and minute amounts of other by-product substances.

I claim:

1. A process for the bromination of a 1,1,3,3-tetraloweralkoxypropane having the formula

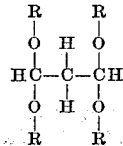

wherein each R is $C_1$–$C_3$ alkyl to obtain predominantly a 2-bromo-3-loweralkoxyacrolein, which comprises (a) adding bromine to said 1,1,3,3-tetraloweralkoxypropane;

(b) heating the resulting mixture to boiling at atmospheric pressure for a period of from about 10 to about 30 minutes; and (c) then heating the mixture at a temperature of from about 100° C. to about 120° C. at a pressure of from about 5 to about 10 mm. of Hg for a period of about 30 to about 60 minutes.

2. A process as in Claim 1 wherein the bromine and the 1,1,3,3-tetraloweralkoxypropane are commingled in a lower alkanol solvent.

3. A process as in Claim 1 wherein the 1,1,3,3-tetraloweralkoxypropane is 1,1,3,3-tetramethoxypropane.

4. A process as in Claim 2 wherein the lower alkanol solvent is methanol.

5. A process as in Claim 2 wherein the 1,1,3,3-tetraloweralkoxypropane is 1,1,3,3-tetramethoxypropane and the lower alkanol is methanol.

References Cited

Bredereck et al., "Chem. Berielite," vol. 95, pp. 803–809 (1962).

Shostakovskii et al., "Chem. Abstracts," vol. 56, p. 5808c (1962).

LEON ZITVER, Primary Examiner

D. B. SPRINGER, Assistant Examiner

U.S. Cl. X.R.

260—251 R, 307 H, 310 R, 615 A